219-121

4/1/86 OR 4,580,031 SR

United States Patent [19] | [11] Patent Number: 4,580,031

Bebber et al. | [45] Date of Patent: Apr. 1, 1986

[54] PLASMA BURNER AND METHOD OF OPERATION

[75] Inventors: Hans J. Bebber, Mülheim; Gebhard Tomalla; Heinrich-Otto Rossner, both of Essen, all of Fed. Rep. of Germany

[73] Assignee: Fried. Krupp Gesellschaft mit beschränkter Haftung, Essen, Fed. Rep. of Germany

[21] Appl. No.: 636,411

[22] Filed: Jul. 31, 1984

[30] Foreign Application Priority Data

Aug. 10, 1983 [DE] Fed. Rep. of Germany ....... 3328777

[51] Int. Cl.[4] .................................... B23K 9/00

[52] U.S. Cl. ....................... 219/121 PY; 219/121 PM; 219/121 PP; 219/121 PR

[58] Field of Search .................. 219/121 PM, 121 PP, 219/121 PQ, 121 PR, 75, 76.16; 313/231.31-231.51; 315/111.21, 111.31

[56] References Cited

U.S. PATENT DOCUMENTS 4,389,559 6/1983 Rotolico et al. ............. 219/121 PP

FOREIGN PATENT DOCUMENTS 1440628 4/1971 Fed. Rep. of Germany .
1764116 4/1971 Fed. Rep. of Germany .
1440594 3/1974 Fed. Rep. of Germany .
2900330 7/1979 Fed. Rep. of Germany .
3024339 1/1982 Fed. Rep. of Germany .
142267 12/1980 German Democratic Rep. .

OTHER PUBLICATIONS

Elektrowärme International [Electro Heat International] (German Magazine), vol. 30, No. 3, Jun. 1972, pp. 141-156.

DVS-Berichte [DVS Reports], vol. 8, Düsseldorf, FRG, published by Deutscher Verlag für Schweisstechnik (DVS) GmbH, 1970.

*Journal of Metals*, Dec. 1962, pp. 907-911.

*Primary Examiner*—M. H. Paschall
*Attorney, Agent, or Firm*—Spencer & Frank

[57] ABSTRACT

Plasma burner having a frontal face from which a plasma jet is to be projected, for producing a long initial firing arc, having first and second concentrically arranged electrodes extending perpendicularly to the frontal face, and a nozzle surrounding the electrodes, the first electrode being centrally arranged to constitute an auxiliary electrode and having a cylindrical main portion, an electrode tip at its front end and a conically tapered portion located between the main portion and the electrode tip and tapering toward the electrode tip, the second electrode being annular and surrounding the first electrode to constitute a nozzle electrode, and having a central channel composed, successively, in the direction toward the frontal face, of a first cylindrical section, a conically tapered section and a second cylindrical section smaller in diameter than the first cylindrical section, the central channel and the first electrode together forming an annular channel. The diameter of the first cylindrical section is 1.2 to 2.5 times the diameter of the cylindrical portion. The tapered portion and the tapered section each have a cone angle of 20° to 80°. The distance between the electrode tip and the plane of the transition between the conically tapered section and the second cylindrical section of the central channel, taken with reference to the direction in which the conically tapered portion tapers is such that the ratio of that distance to the diameter of the second cylindrical section is between −1 and +2.

17 Claims, 2 Drawing Figures

PLASMA BURNER AND METHOD OF OPERATION

BACKGROUND OF THE INVENTION

The present invention relates to a plasma burner equipped with two concentrically arranged electrodes and a nozzle surrounding the electrodes. The first one of the electrodes, known as the auxiliary electrode, is tapered at its front end. The second electrode is equipped with a central channel composed of a first cylindrical section, a conical taper and a second cylindrical section, narrower than the first, possibly followed by a wider section. The auxiliary electrode extends into the center of this central channel. The second electrode and the auxiliary electrode form an annular channel. The present invention also relates to a method for operating such a plasma burner.

In prior art devices, an electric arc, known as the auxiliary, or pilot, arc, is generated and maintained with the aid of a direct current source connected between the auxiliary electrode and the nozzle-shaped second electrode. Moreover, a gas jet is brought into contact with the auxiliary arc and is conducted through the nozzle electrode so as to drive the plasma formed by the auxiliary arc to a third electrode. The direct current source here serves not only to maintain the auxiliary arc between the auxiliary and second electrodes, but primarily also to heat the plasma generated by the electric arc and driven to the third electrode.

The current source between the second and third electrodes may be either a direct current source or, as disclosed for example in German Patent No. 1,440,594, an alternating current source. If an alternating current source is employed, the direct current arc burning between the auxiliary electrode and the second electrode serves to generate a continuous stream of ionized plasma and to bring this stream into the range of the primary, or main, arc which is maintained by alternating current. This is intended primarily to permit refiring of the primary arc after each zero passage of the alternating current and to additionally prevent thermal overloads on the nozzle electrode due to the alternating current spot burn at this electrode.

In addition to maintaining the alternating current arc and preventing thermal overloads on the alternating current electrode of a plasma burner, an auxiliary arc is often also required to start the plasma burner. This is done in that the plasma flame produced by the auxiliary arc and leaving the burner mouth forms a channel of ionized gas between the burner electrode and a counterelectrode or the material to be heated or melted, respectively, in which the primary arc—be it direct or alternating circuit—can begin to flow as soon as the primary arc voltage is applied between the burner electrode and the counterelectrode. For this purpose, the auxiliary arc may be generated, for example, between the burner electrode and the burner nozzle surrounding the burner electrode and forming the mouth for the burner material or between two auxiliary electrodes or also between the auxiliary electrode and the nozzle electrode of the above-described arrangement. Prerequisite for the initial firing of the primary arc is that the plasma firing flame extends to the counterelectrode or to the material to be melted and thus provides an uninterrupted electrically conductive path between the burner electrode and the counterelectrode. Consequently, the shorter the firing flame, the closer the plasma burner must be moved to the counterelectrode.

However, for many uses it is desirable or even necessary from an engineering point of view to fire the plasma burner from the greatest possible distance from the counterelectrode or from the material to be heated or melted, respectively, particularly if the material is bulky, such as scrap, for example, and the material does not present an essentially planar, but rather a craggy, surface. Since plasma burners must not come into contact with electrically conductive material as that would destroy them, it is of extreme importance in practical operation to be able to start the plasma burners at a safe distance from the surface of the material to be melted, i.e. with a correspondingly long firing flame.

If an electric arc arrangement as disclosed in German Patent No. 1,440,594 is employed, firing flame lengths of no more than 6 to 8 cm can be realized even if the primary arc current intensity and the plasma gas throughput are optimized. The device disclosed in German Offenlegungsschrift [Laid-open Application] 2,900,330 also does not result in sufficiently long firing flames.

SUMMARY OF THE INVENTION

It is an object of the present invention to provide a plasma burner of the above-mentioned type which forms a plasma firing flame of sufficient length to permit firing of the plasma burner on lightweight, bulky scrap safely and without physical contact.

The above and other objects are achieved by a combination of structural features for a plasma burner having a frontal face from which a plasma jet is to be projected, for producing a long initial firing arc, the burner comprising first and second concentrically arranged electrodes extending perpendicularly to the frontal face, and a nozzle surrounding the electrodes, the first electrode being centrally arranged in the burner to constitute an auxiliary electrode and having a cylindrical main portion, an electrode tip at the end of the first electrode which is directed toward the frontal face, and a conically tapered portion located between the main portion and the electrode tip and tapering toward the electrode tip, the second electrode being annular and surrounding the first electrode to constitute a nozzle electrode, and being formed to have a central channel composed, successively, in the direction toward the frontal face, of a first cylindrical section, a conically tapered section and a second cylindrical section smaller in diameter than the first cylindrical section, and the central channel and the first electrode together forming an annular channel. According to the invention:

- the diameter of the first cylindrical section of the central channel is 1.2 to 2.5 times the diameter of the cylindrical portion of the first electrode;
- the tapered portion of the first electrode and the tapered section of the central channel have a cone angle of 20° to 80°; and
- the transition between the conically tapered section and the second cylindrical section of the central channel lies in a plane perpendicular to the axis of the electrodes, and the distance between the electrode tip and the plane, taken with reference to the direction in which the conically tapered portion tapers to the electrode tip, is such that the ratio of that distance to the diameter of the second cylindrical section of the central channel is between $-1$ and $+2$.

Each cone angle referred to above is the angle between two linear generatrices of the associated conically tapered surface which lie in a common plane containing the axis of the cone defined by that surface.

The diameter of the first cylindrical section is 1.2 to 2.5 times as large, preferably 1.5 to twice as large as the diameter of the auxiliary electrode. The conical taper of the central channel has a cone angle between 20° and 80°, advantageously between 30° and 60°. The taper of the auxiliary electrode has a cone angle between 20° and 80°, with the taper of the auxiliary electrode possibly being followed, in the direction toward the tip of the electrode, by a further cone having a larger cone angle between 40° and 180°. Alternatively, the tip region of the auxiliary electrode may also be designed as a calotte, i.e. in the form of a spherical segment. The diameter (D) of the widened section of the central channel is up to three times larger than diameter (d) of the second cylindrical section; preferably the ratio of D/d lies between 1 and 1.5. The auxiliary electrode is placed in such a manner that its electrode tip lies approximately at the height, i.e. in the plane, of the transition of the conical section of the central channel to the second, narrower cylindrical section. If the distance, a, along the axis of the electrode tip from this transition surface, or plane, is defined with reference to the direction in which the auxiliary electrode tapers toward the electrode tip, so that this distance has a negative sign if the tip of the auxiliary electrode extends into the second, narrower cylindrical section of the central channel, the ratio of a/d is selected to be between $-1$ and $+2$, and preferably between 0 and 1.

Thus, a solution has been found by the present invention in which the geometry of the auxiliary electrode as well as the interior contours of the nozzle electrode are matched to one another in such a way that the jet of ionized gas, which exists centrally from the nozzle electrode and which magnetohydrodynamically is considered to be a free jet, forms a narrow but long channel which has very high electrical conductivity and is thus able to assure a current flow sufficient for firing the primary arc over the longest possible path.

The present invention takes into account the realization that the nozzle opening should have a cylindrical shape and the frontal delimitation of the nozzle should be given the sharpest edges possible. The thus formed edge leads to very small jet divergence. Therefore the widened section or bore, respectively, which has the diameter D is dimensioned in such a way that the primary arc which starts at its frontal face does not change the nozzle opening responsible for the formation of the firing arc.

The formation of the longest possible firing flame is connected with the dimensions of the annular gap between the nozzle electrode and the auxiliary electrode. The conical configuration of the auxiliary electrode and of the central channel causes the cold gas used for plasma formation to be introduced in the best possible way through the thus formed cylindrical gap into the conical region provided for the firing arc.

According to another feature of the invention, the length, l, of the second, narrower cylindrical section of the central channel and the diameter, d, of this section are selected in such a manner that they have a ratio between 0.2 and 3, and preferably between 1 and 1.5. A smaller ratio leads to an insufficiently stabilized, not exactly axially burning firing flame, while a greater ratio causes the ionized gas to be cooled unnecessarily, which would lead to the firing flame being shortened.

Advantageously, the inner cross section of the annular gap in the central channel of the nozzle electrode provided for the plasma gas for the firing arc is dimensioned in such a manner that, starting from the annular gap and extending through the conical region at the level of the auxiliary electrode tip to the second, narrower cylindrical section of the central channel, the annular gap monotonically decreases in size in the direction of flow.

Finally, the interior of the annular channel between the nozzle electrode and the nozzle surrounding this electrode is provided with an electrically insulating lining so as to prevent the formation of parasitic arcs as they may occur with the prior art purely cold gas insulations.

The above-described apparatus with the geometry according to the present invention as illustrated in the drawing to be described below has the result that the ionized gas can be introduced laminarly into the conical region and the gas jet remains laminar until it leaves the nozzle electrode.

In addition to apparatus, the present invention involves a method in which the introduction of plasma gas through the central channel into the firing range of the auxiliary arc (firing arc) is adjusted so that its Reynolds number lies between 10 and 2300, and preferably between 10 and 100. This also has advantages with respect to the generation of a firing arc flame of optimum length.

Experience in practice with the apparatus and the method according to the present invention indicates that the voltage consumption of the firing arc, determined essentially by the geometry of the present invention, is so high that current intensities of 200 to 300 A are already sufficient to generate the desired long firing arc.

Due to these low current intensities, noticeable wear phenomena occur neither at the nozzle electrode nor at the auxiliary electrode. Moreover, the configuration of the auxiliary electrode, whose cone forms the inner boundary, and the configuration of the nozzle electrode which forms the outer boundary of the central channel, assure that the firing arc always starts in a reliable, reproducible manner, at geometrically well defined locations. This leads to a firing arc flame which is always exactly axially oriented relative to the electrodes.

Additionally, it has been found by operation in practice that the firing or auxiliary arcs and the primary arc are substantially electrically decoupled and thus firing of the primary arc can be effected in an optimum manner.

According to a further feature of the invention, the auxiliary arc is maintained by means of an alternating current source which has the advantage that the auxiliary arc and the primary arc can be fed from one current source.

One embodiment of the invention is illustrated in the drawing and will be described in greater detail below.

DESCRIPTION OF THE PREFERRED EMBODIMENTS

Figure 1:
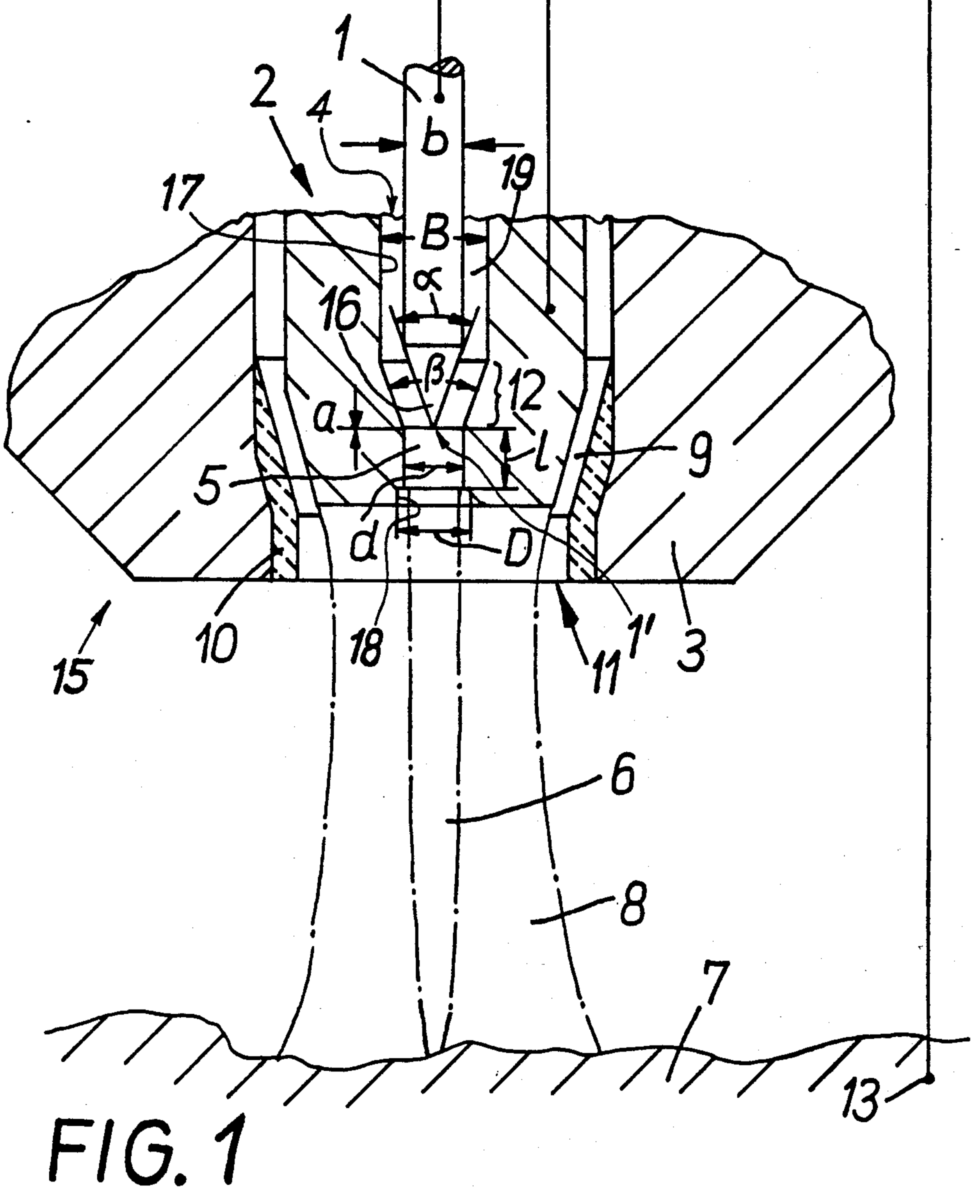
FIG. 1 is a schematic, longitudinal, cross-sectional view of sections of a plasma burner according to the invention.

The plasma burner 15 shown in FIG. 1 is composed essentially of an auxiliary electrode 1, an annular electrode 2 and a nozzle 3 surrounding electrode 2. The auxiliary electrode 1 is a solid rod electrode whose cylindrical body has a diameter b. The auxiliary electrode 1 has at its front end a conical taper 16 which ends in electrode tip 1'. The cone angle $\alpha$ of this taper 16 is, e.g., 40°.

Electrode 2 constitutes a nozzle electrode and has a central bore, or channel, 4 into which extends the abovementioned auxiliary electrode 1. Central channel 4 has, in the direction of gas flow, a first cylindrical section 17, a conically tapering section 12 and a second cylindrical section 5, narrower than section 17, followed by a cylindrical widened section 18 having the diameter D.

The first cylindrical section 17 has a diameter B so that an annular gap 19 having the radial width (B-b)/2 is formed between nozzle electrode 2 and auxiliary electrode 1.

The conically tapering section 12 connects cylindrical section 17 having diameter B with cylindrical section 5 having the smaller diameter d and has a cone angle $\beta$ which, like angle $\alpha$, has an exemplary value of 40°, so that the generatrices of conical taper 16 and conically tapering section 12 are parallel to one another. Due to the fact that the cross-sectional areas of central channel 4 and auxiliary electrode 1 become smaller, this configuration makes it possible in a simple manner for the annular gap 19 to be uniformly reduced in size in the region of the conically tapering section 12 in a direction toward the frontal face 11 of plasma burner 15.

Radially from the axis of electrode 1, nozzle electrode 2 is followed by an annular channel or gap 9 which itself is delimited by burner nozzle 3. In the region of the outer plasma channel boundary, i.e. extending rearwardly from frontal face 11 of plasma burner 15, the interior of nozzle 3 is provided with an electrically insulating layer 10 which effectively prevents the formation of parasitic arcs.

Plasma burner 15 shown in FIG. 1 has such dimensions that distance a from electrode tip 1' to the transition region between the conically tapering section 12 to the second cylindrical section 5 is selected to be zero in the illustrated arrangement. The length l of the second, narrower cylindrical section 5 has been selected in such a manner that the ratio l/d=1. Further in the illustrated arrangement, the ratio B/b is 1.7 and the ratio D/d is 1.25. The apparatus according to the present invention produces a long firing arc 6 which is sufficient to fire the primary arc 8 over a path of at least 15 cm. In FIG. 1, the arc is directed to melt a mass of material 7.

Figure 2:
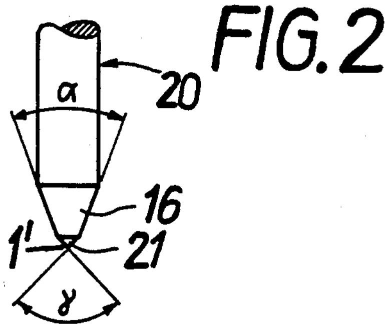
FIG. 2 is a detail elevational view of an embodiment of an auxiliary electrode having conical tapers at its tip.

As a modification of the embodiment described above, the auxiliary electrode 20 shown in FIG. 2 has a conical taper 16 in the form of a cone frustum which has a cone angle $\alpha=40°$ followed, in the direction toward the electrode tip 1', by a taper 21 having, for example, a cone angle $\gamma=90°$.

FIG. 1 also shows schematically a current supply 14 for electrodes 1 and 2. This includes a current supply 14' for the firing or auxiliary arc 6, connected with auxiliary electrode 1 and nozzle electrode 2 or with its terminals, respectively. Supply 14' may be a direct current source or an alternating current source. Supply 14 also includes a current supply 14" for primary arc 8, connected to nozzle electrode 2 and to a counterelectrode 13 which will be conductively connected to material 7. If current supply 14' as well as current supply 14" are operated with alternaing current, it is possible, if appropriate electrical components are employed with which the person skilled in the art is familiar, to use only one current supply operating with only one type of current. However, in principle, it is also possible to generate the two arcs 6 and 8 by connecting the electrodes 1 and 2 to a single, common direct current supply.

For operation of the above-described plasma burner 15, the plasma gas supply through central channel 4 into the region of the auxiliary or firing arc 6 is adjusted in such a way that the Reynolds number Re lies between 10 and 2300, and preferably, however, between 10 and 100, essentially throughout the hole length of channel 4, i.e. through its sections 17, 12 and 5. The Reynolds number Re, for example, in the second, narrower cylindrical section 5 is defined by $Re=(v.\ d)/\nu$, where v is the gas flow speed, $\nu$ the kinematic viscosity of the plasma gas and d, as alredy defined, the diameter of section 5.

Annular channel 9 is assigned for operating the primary arc, whereby even before firing the same plasma gas may be supplied through channel 9, the Reynolds number Re of the gas flow being up to 50,000.

It will be understood that the above description of the present invention is susceptible to various modifications, changes and adaptations, and the same are intended to be comprehended within the meaning and range of equivalents of the appended claims.

What is claimed is:

1. Plasma burner for producing an elongated initial firing arc, said buner having a frontal face from which a plasma jet is to be projected, said burner comprising first and second concentrically arranged electrodes having a common axis which extends perpendicularly to said frontal face, and a nozzle surrounding said electrodes, said first electrode being centrally arranged in said burner to constitute an auxiliary electrode and having a cylindrical main portion and an electrode tip at the end of said first electrode which is directed toward said frontal face, said first electrode further having a concially tapered portion loacated between said main portion and said electrode tip and tapering toward said electrode tip, said second electrode being annular and surrounding said first electrode to constitute a nozzle electrode, and being formed to have a central channel composed, successively, in the direction toward said frontal face, of a first cylindrical section, a conically tapered section and a second cylindrical section smaller in diameter than said first cylindrical section, said conically tapered section of said central channel meeting said second cylindrical section of said central channel at a transition plane, and said central channel and said first electrode together forming an annular channel, wherein:

the diameter of said first cylindrical section of said cental channel is 1.2 to 2.5 times the diameter of said cylindrical portion of said first electrode;

said tapered portion of said first electrode and said tapered section of said central channel have a cone angle of 20° to 80°; and the transition plane between said conically tapered section and said second cylindrical section of said central channel is perpendicular to the common axis of said electrodes, and said first electrode is positioned so that said electrode tip is located on said common axis within a linerar region having first and second end boundaries, the first end boundary being spaced from said transition plane in the direction toward said frontal face and having a distance from said transition plane which is equal to the diameter of said second cylindrical section of said central channel, and the second end boundary being spaced from said transition plane in the direction away from said frontal face and having a distance from said transition plane which is equal to twice the diameter of said second cylindrical section of said central channel.

2. Plasma burner as defined in claim 1 wherein said central channel is further composed of a third cylindrical section following said second cylindrical section in the direction toward said frontal face and having a diameter which is larger than, and up to three times larger than, the diameter of said second cylindrical section.

3. Plasma burner as defined in claim 2 wherein the ratio of the length of said second cylindrical section, along the axis of said electrodes, to the diameter of said second cylindrical section is between 0.2 and 3.

4. Plasma burner as defined in claim 3 wherein the ratio of the length to the diameter of said second cylindrical section is between 1 and 1.5.

5. Plasma burner as defined in claim 3 wherein the ratio of the diameter of said first cylindrical section to the diameter of said main portion of said first electrode is between 1.5 and 2.

6. Plasma burner as defined in claim 5 wherein the ratio of the diameter of said first cylindrical section to the diameter of said main portion of said first electrode is substantially 1.7.

7. Plasma burner as defined in claim 2 wherein said first electrode further has a second conically tapered portion located between said first-recited conically tapered portion and having a cone angle which is larger than that of said first-recited conically tapered portion and is between 40° and 80°.

8. Plasma burner as defined in claim 2 wherein the cone angle of said tapered section of said central channel is between 30° and 60°.

9. Plasma burner as defined in claim 8 wherein the cone angle of said tapered section of said central channel is substantially 40°.

10. Plasma burner as defined in claim 2 wherein the ratio of the diameter of said third cylindrical section to the diameter of said second cylindrical section is between 1 and 1.5.

11. Plasma burner as defined in claim 10 wherein the ratio of the diameter of said third cylindrical section to the diameter of said second cylindrical section is substantially 1.25.

12. Plasma burner as defined in claim 2 wherein the ratio of the distance bewteen said electrode tip and said plane to the diameter of said second cylindrical section is between 0 and +1.

13. Plasma burner as defined in claim 2 wherein the cross section of said annular channel decreases uniformly in the direction toward said frontal face of said plasma burner.

14. Plasma burner as defined in claim 2 wherein said nozzle is radially spaced from said second electrode to form therewith an annular nozzle channel, and further comprising an electrically insulating lining carried by said nozzle within said nozzle channel.

15. Method of operating a plasma burner for producing an elongated initial firing arc, said burner having a frontal face from which a plasma jet is to be prjected, said burner comprising first and second concentrically arranged electrodes having a common axis which extends perpendicularly to said frontal face, and a nozzle surrounding said electrodes, said first electrode being centrally arranged in said burner to constitute an auxiliary electrode and having a cylindrical main portion and an electrode tip at the end of said first electrode which is directed toward said frontal face, said first electrode further having a concially tapered portion located between said main portion and said electrode tip and tapering toward said electrode tip, said second electrode being annular and surrounding said first electrode to constitute a nozzle electrode, and being formed to have a central channel composed, successively, in the direction toward said frontal face, of a first cylindrical section, a conically tapered section and a second cylindrical section smaller in diameter than said first cylindrical section, said conically tapered section of said central channel meeting said second cylindrical section of said central channel at a transition plane, and said central channel and said first electrode together forming an annular channel, wherein:

the diameter of said first cylindrical section of said central channel is 1.2 to 2.5 times the diameter of said cylindrical portion of said first electrode;

said tapered portion of said first electrode and said tapered section of said central channel have a cone angle of 20° to 80°; and the transition plane between said concially tapered section and said second cylindrical section of said central channel is perpendicular to the common axis of said electrodes, and said first electrode is positioned so that said electrode tip is located on said common axis within a linear region having a first and second end boundaries, the first end boundary being spaced from said transition plane in the direction toward said frontal face and having a distance from said transition plane which is equal to the diameter of said second cylindrical section of said central channel, and the second end boundary being spaced from said transition plane in the direction away from said frontal face and having a distance from said transition plane which is equal to twice the diameter of said second cylindrical section of said central channel, wherein said central channel is further composed of a third cylindrical section following said second cylindrical section in the direction toward said frontal face and having a diameter which is larger than, and up to three times larger than, the diameter of said second cylindrical section, said method comprising creating an electric current between said first and second electrodes while causing a plasma-forming gas to flow through said central channel to form an initial firing arc which is projected from said frontal face of said burner, said step of causing being carried out by supplying gas to said central channel in a manner such that the Reynolds number of gas flow in at least a portion of said channel has a value of between 10 and 2300.

16. Method as defined in claim 15 wherein said Reynolds number has a value of between 10 and 100.

17. Method of operating a plasma burner for producing an elongated initial firing arc, said burner having a frontal face from which a plasma jet is to be projected, said burner comprising first and second concentrically arranged electrodes having a common axis which extends perpendicularly to said frontal face, and a nozzle surrounding said electrodes, said first electrode being centrally arranged in said burner to constitute an auxiliary electrode and having a cylindrical main portion and an electrode tip at the end of said first electrode which is directed toward said frontal face, said first electrode further having a conically tapered portion located between said main portion and said electrode tip and tapering toward said electrode tip, said second electrode being annular and surrounding said first electrode to constitute a nozzle electrode, and being formed to have a central channel composed, successively, in the direction toward said frontal face, of a first cylindrical section, a conically tapered section and a second cylindrical section smaller in diameter than said first cylindrical section, said conically tapered section of said central channel meeting said second cylindrical section of said central channel at a transition plane, and said central channel and said first electrode together forming an annular channel, wherein:

the diameter of said first cylindrical section of said central channel is 1.2 to 2.5 times the diameter of said cylindrical portion of said first electrode;

said tapered portion of said first electrode and said tapered section of said central channel have a cone angle of 20° to 80°; and the transition plane between said conically tapered section and said second cylindrical section of said central channel is perpendicular to the common axis of said electrodes, and said first electrode is positioned so that said electrode tip is located on said common axis within a linear region having first and second end boundaries, the first end boundary being spaced from said transition plane in the direction toward said frontal face and having a distance from said transition plane which is equal to the diameter of said second cylindrical section of said central channel, and the second end boundary being spaced from said transition plane in the direction away from said frontal face and having a distance from said transition plane which is equal to twice the diameter of said second cylindrical section of said central channel, wherein said central channel is further composed of a third cylindrical section following said second cylindrical section in the direction toward said frontal face and having a diameter which is larger than, and up to threee times larger than, the diameter of said second cylindrical section, said method comprising causing a plasma-forming gas to flow through said central channel, and supplying, from a single current source, an alternating current to said burner to create, with the gas, an initial firing arc, and a primary arc-forming current to said burner to create a primary arc.

* * * * *